(12) United States Patent
Salhoff et al.

(10) Patent No.: US 7,152,907 B2
(45) Date of Patent: Dec. 26, 2006

(54) MOTOR VEHICLE SUB-ASSEMBLY

(75) Inventors: Thomas Salhoff, Niederfullbach (DE); Martin Schwarz, Coburg (DE)

(73) Assignee: Brose Fahrzeugtelle GmbH & Co KG, Coburg, Coburg (DE)

( * ) Notice: Subject to any disclaimer, the term of this patent is extended or adjusted under 35 U.S.C. 154(b) by 0 days.

(21) Appl. No.: 10/487,470

(22) PCT Filed: Aug. 23, 2002

(86) PCT No.: PCT/DE02/03158

§ 371 (c)(1),
(2), (4) Date: Feb. 20, 2004

(87) PCT Pub. No.: WO03/018387

PCT Pub. Date: Mar. 6, 2003

(65) Prior Publication Data

US 2004/0239144 A1 Dec. 2, 2004

(30) Foreign Application Priority Data

Aug. 23, 2001 (DE) ............................... 101 42 835
Aug. 20, 2002 (DE) ............................... 102 38 020

(51) Int. Cl.
*B06J 5/00* (2006.01)
*H01B 7/08* (2006.01)

(52) U.S. Cl. .............................. 296/146.7; 174/74 TR; 174/88 R

(58) Field of Classification Search ............. 296/146.7, 296/152; 174/74 TR, 88 R
See application file for complete search history.

(56) References Cited

U.S. PATENT DOCUMENTS

| 3,696,412 A * | 10/1972 | Swanson ..................... 340/668 |
| 4,824,164 A * | 4/1989 | Nakayama et al. ...... 296/146.7 |
| 5,369,871 A | 12/1994 | Goto et al. |
| 5,479,687 A * | 1/1996 | Sawdon ..................... 29/243.5 |
| 5,929,382 A * | 7/1999 | Moore et al. ........... 174/72 TR |
| 6,142,556 A * | 11/2000 | Tanaka et al. .......... 296/146.7 |
| 6,462,279 B1 * | 10/2002 | Serizawa et al. ......... 174/72 A |
| 2002/0058429 A1 * | 5/2002 | Feder et al. .................. 439/86 |
| 2004/0099366 A1 * | 5/2004 | Hubner ....................... 156/155 |

FOREIGN PATENT DOCUMENTS

| DE | 200 14 701 U1 | 1/2001 |
| DE | 201 18 469 U1 | 7/2002 |

(Continued)

OTHER PUBLICATIONS

Automotive Engineering, Nov. 1991, p. 56, "TOG-L-LOC" sheet metal joining system, advertisement for BTM Corporation.*

(Continued)

*Primary Examiner*—Dennis H. Pedder
(74) *Attorney, Agent, or Firm*—Christie, Parker & Hale LLP

(57) ABSTRACT

The invention relates to a sub-assembly for a motor vehicle unit, especially the door unit of a motor vehicle, comprising a support element and a conductor arrangement which is fixed to the support element. According to the invention, at least one fixing section of the conductor arrangement (1) and one fixing section associated with the support section (2) are plastically deformed in such a way that they interlink with each other.

26 Claims, 16 Drawing Sheets

FOREIGN PATENT DOCUMENTS

| | | |
|---|---|---|
| EP | 0 534 659 A2 | 3/1993 |
| EP | 0 833 063 A1 | 4/1998 |
| EP | 1 104 720 A1 | 6/2001 |
| JP | 6-188060 | 7/1994 |
| JP | 7-503663 | 4/1995 |
| JP | 11-195327 | 7/1999 |
| JP | 2000-81011 | 3/2000 |
| WO | WO 93/10925 | 6/1993 |

OTHER PUBLICATIONS

International Search Report of PCT/DE02/03158, dated Jan. 31, 2003.

International Preliminary Examination Report of PCT/DE02/03158, dated Nov. 20, 2003.

English Translation of International Preliminary Examination Report of PCT/DE02/03158, dated Nov. 11, 2003.

Patent Abstracts of Japan, Publication No. 06188060, dated Jul. 8, 1994, in the name of Hidenori Goto et al.

Patent Abstracts of Japan, Publication No. 2000-081011, dated Mar. 21, 2000, in the name of Norimichi Kobayashi.

Partial English translation of JP 2000-081011 listed above.

English translation of Japan Office action dated May 23, 2006.

* cited by examiner

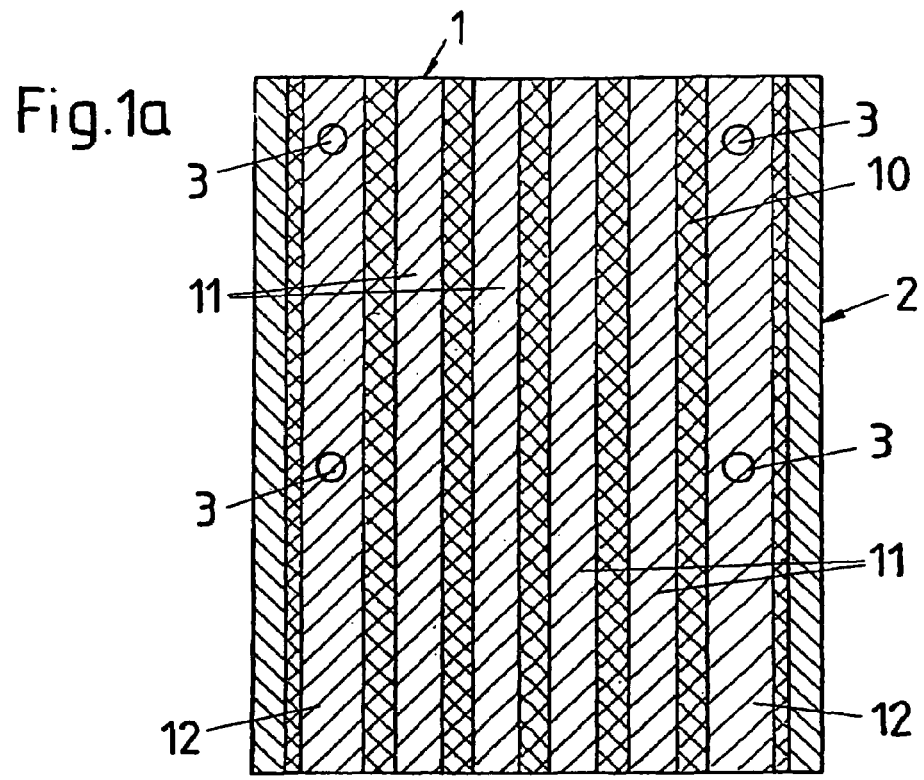
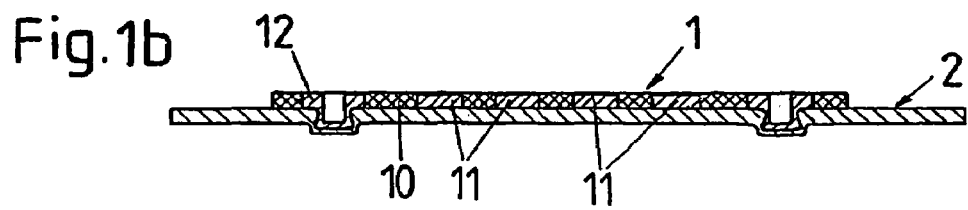
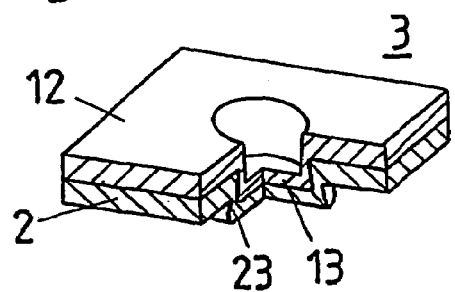

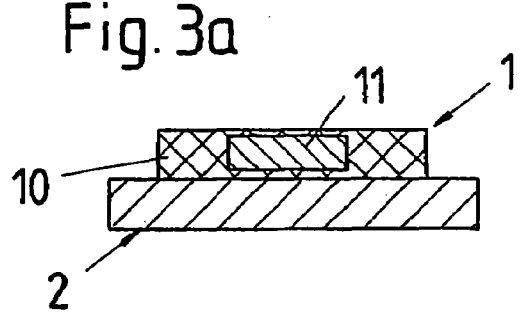
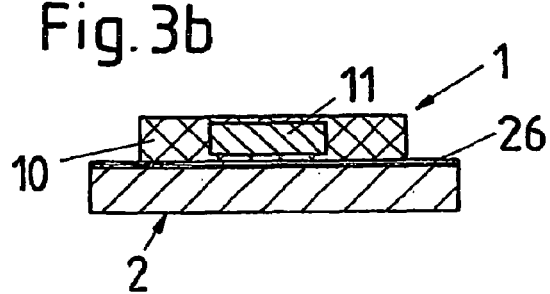
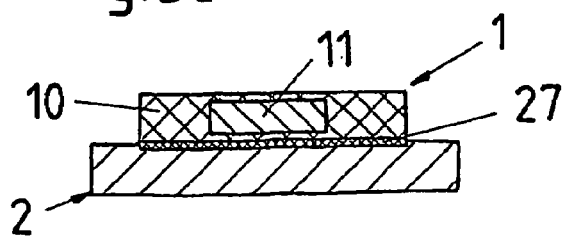

MOTOR VEHICLE SUB-ASSEMBLY

CROSS-REFERENCE TO RELATED APPLICATION

This application is a National Phase Patent Application of International Application Number PCT/DE02/03158, filed on Aug. 23, 2002, which claims priority of German Patent Application Number 101 42 835.9, filed on Aug. 23, 2001, and German Patent Application Number 102 38 020.1, filed on Aug. 20, 2002.

FIELD OF THE INVENTION

The invention relates to a motor vehicle sub-assembly, more particularly a sub-assembly for a motor vehicle door or a door sub-assembly as well as to a connection of component parts.

A sub-assembly or connection of component parts comprises a flat surface supporting element as well as a conductor arrangement fixed on this supporting element which can serve by way of example to supply current to electrical components of a vehicle or to send signals.

BACKGROUND

A number of different measures is already known for fixing conductors on elements of a motor vehicle or other supporting elements. One example is the use of clip elements, which on the one hand engage around the wiring which is to be fixed, and on the other engage in an opening of the element which is used to hold the wiring. The problem with this measure is that in many cases the fixing opening which is associated with the clip element has to be sealed, e.g. if the wiring is to be fixed on a supporting door element (door inner panel or door module support) which serves to separate the dry space of the vehicle door from the wet space of the vehicle door.

From DE 200 14 701 U1 a self-adhesive electric or optic cable is known which can be fixed on a vehicle part by means of an adhesive layer. For this the surface area must be sufficiently grease and oil free.

SUMMARY

The invention is concerned with the problem of providing a sub-assembly of the type already mentioned which in a simple way enables the conductor arrangement to be fixed on a supporting element.

According to this at least one fixing section of the conductor path assembly and an associated section of the supporting element are plastically deformed so that they engage in each other whereby the conductor arrangement is held on the supporting element. Thus, a connection is produced by re-shaping the corresponding material sections (joining by re-forming).

The solution according to the invention has the advantage that a connection between a conductor arrangement and an element supporting the conductor arrangement can be readily produced by common plastic deformation of a section of the conductor arrangement as well as a section of the supporting element.

The term conductor arrangement is meant to include any conductor configuration, thus for example both an individual electrical conductor and a number of electrical conductors mounted side by side on a support. The conductor arrangement can thereby be formed in particular by flat conductors which are mounted in the form of a foil on a flexible support, or by a flexible conductor plate. The solution according to the invention can be used in particular on different conductor types, e.g. both electrical and optical conductors.

The term supporting element is meant to include any vehicle part, more particularly an element of a motor vehicle door on which an electrical conductor arrangement can be fixed.

As a result of the plastic deformation aspect of the invention, the fixing section of the conductor arrangement and the associated section of the supporting element interlink with each other preferably with positive locking action, e.g. by one fixing section engaging with positive locking action in an undercut section of the other fixing section.

The two fixing sections can advantageously be deformed and thus interlink with each other so that neither of the two fixing sections forms a through opening. Thus a connection is produced which requires no additional seal and therefore can be used with particular advantage for fixing an electrical conductor arrangement on a supporting element which serves to separate a dry space from the wet space of the vehicle.

In a preferred embodiment of the invention the fixing section of the supporting element engages in the fixing section of the conductor arrangement. This enables a reliable mechanical connection which can withstand tension loading and whose strength and stability substantially depends on the deformability of the fixing section of the conductor arrangement. By way of example a copper conductor path is formed thick enough for the fixing section of the conductor arrangement to produce the desired strength.

In order to ensure the strength and rigidity substantially independently of the quality of the conductor of the conductor arrangement, a further aspect of the invention is the use of an additional element whereby at least one fixing section of the conductor arrangement, an associated fixing section of the supporting element, and a fixing section of the additional element are plastically deformed so that the three fixing sections interlink with each other. The additional element is preferably a metal part which in the ideal case guarantees together with the fixing section of the supporting element a part of the strength of the connection.

In an embodiment of this aspect of the invention the fixing section of the conductor arrangement is an insulation foil which is mounted between the fixing section of the supporting element and the fixing section of the conductor arrangement. This has the advantage that in the region of the fixing there need be no deformable material since the strength and rigidity of the fixing is substantially produced through the arrangement between the two fixing sections of the supporting element and the additional element.

The fixing section of the conductor arrangement, the associated section of the supporting element and that of the additional element interlink with each other preferably with positive engagement as a result of the plastic deformation, e.g. by the one fixing section of the supporting element engaging positively in an undercut section of the fixing section of the conductor arrangement and this in turn in an undercut section of the fixing section of the additional element.

The additional element is in an advantageous further embodiment of the invention used in a multiple function as a mechanical element of a function unit. For example, the additional element can be formed, in addition to its function for fixing the cable, also as a fixing hook for a door element, preferably a door inside trim.

Further synergy effects are achieved if the additional element is additionally designed as a holder for fixing a Bowden cable, a rod linkage or a cable, or as a holding or fixing element for a housing of a function unit, preferably for an electronics housing.

According to one embodiment of the invention a stamped embossed connection between the conductor arrangement and the supporting element can be produced, for example, by applying a pressing ram on the sections of the conductor arrangement provided for fixing on one side and of the supporting element on the other side (clinching). A matrix associated with the ram can thereby serve as an abutment. In a further method step further pressure exerted on the stamped connection makes it possible to enlarge the undercut sections produced and thus to increase the strength and rigidity.

According to another embodiment of the invention the conductor arrangement can be connected to the supporting element by stamped rivets. The conductor arrangement on the one hand and the supporting element on the other are thereby deformed in their fixing sections through the penetrating stamped rivet so that a connection is made. However, the stamped rivet engages in the material of the two fixing sections without passing through these.

The stamped rivet is preferably able to expand so that it engages by its expanded end behind at least one of the two fixing sections.

The fixing section of the conductor arrangement can be formed on the one hand directly through one of the conductors (one of the conductor paths) of the conductor arrangement or on the other hand by an element of the conductor arrangement which is different from the conductor paths.

When directly fixing an electrical conductor path on a supporting element consisting of metal the conductor arrangement must be insulated from the supporting element at least at the fixing points—unless the supporting element is to be used to ground a conductor path.

The insulation can be ensured by way of example through painting the surface of the supporting element or through a separate sealing mass. A support of non-conductive material such as plastic surrounding the conducting paths of the conductor arrangement can also be used as insulation.

In order to avoid additional insulation of the conductor arrangement in the region of the fixing if an electrical conducting path is fixed on a conductive supporting element, in an advantageous embodiment of the invention an insulation section of the conductor arrangement is used for fixing. The insulation section itself or the additional element can guarantee the desired strength of the connection.

According to another embodiment of the invention the conductor arrangement comprises a fixing web specially provided for fixing the conductor arrangement on the supporting element and which extends next to the conducting paths of the conductor arrangement and which forms at least one fixing section of the conductor arrangement or the fixing is produced through a support of the conductor arrangement.

The connection according to the invention between a conductor arrangement and a supporting element can be used not only for vehicle sub-assemblies but generally for connections between component parts between a conductor arrangement and a supporting element. The supporting element can in this case be formed by any element on which a conductor arrangement can be fixed and which to this extent holds, supports or bears the conductor arrangement at least in part.

Also when using the connection of component parts according to the invention outside of vehicle sub-assemblies, e.g. for fixing conductor assemblies in household appliances or machines whereby the supporting element can be formed for example by a housing part, the advantages of the invention already mentioned are achieved and the advantageous further embodiments of the invention described above can be implemented.

Further features and advantages of the invention will be explained in the following description of the embodiments with reference to the drawings.

They show:

FIG. 1a is a plan view of a conductor arrangement which is connected at several fixing points to a supporting element of a vehicle with the fixing sections of the conductor arrangement formed by a separate fixing web;

FIG. 1b is a cross-sectional view through the conductor arrangement of FIG. 1a;

FIG. 1c is a section of the embodiment of FIGS. 1a and 1b in perspective view;

FIGS. 3a–3c are three different possibilities for insulating the conductor paths from a supporting element of the vehicle;

FIG. 4b is a cross-sectional view through the conductor arrangement of FIG. 4a;

Figure 5A:
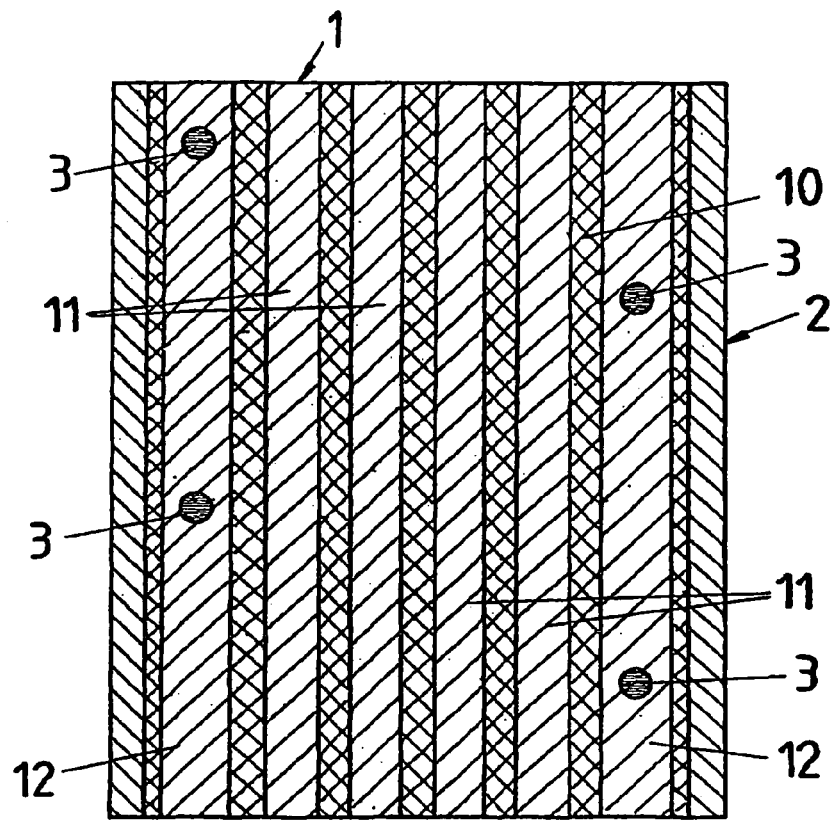
FIG. 5a is a plan view of a conductor arrangement which is connected at several fixing points by stamped rivets to a supporting element of a vehicle whereby the stamped rivets engage in additional fixing webs of the conductor arrangement.
Figure 6A:
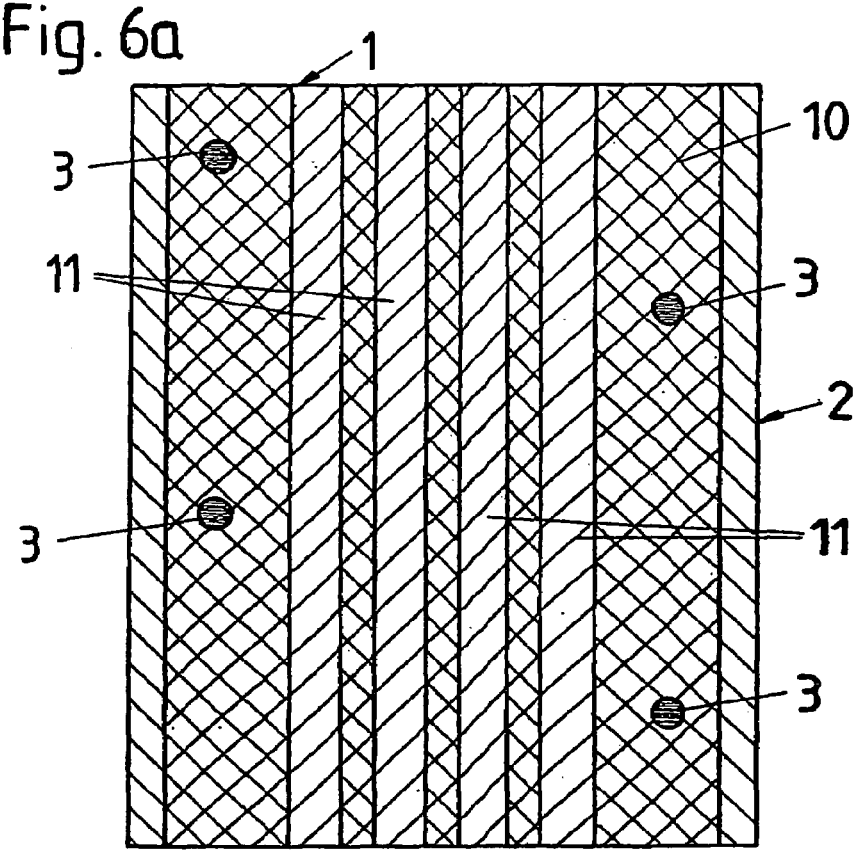
Figure 6B:
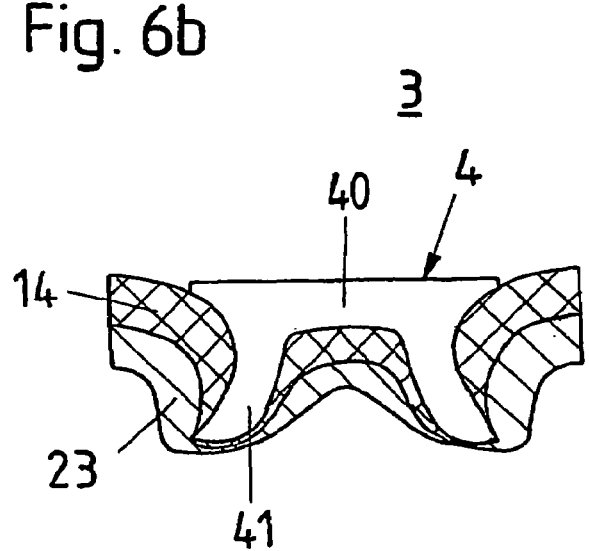
Figure 7A:
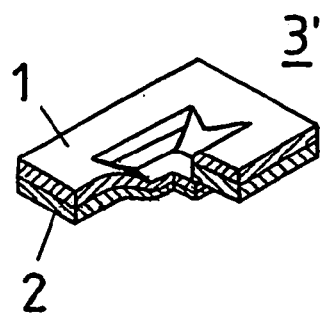
Figure 7B:
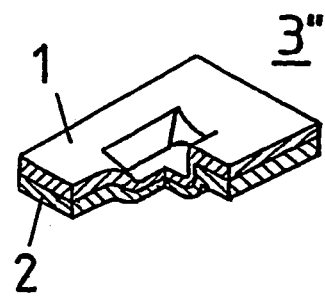
Figure 7C:
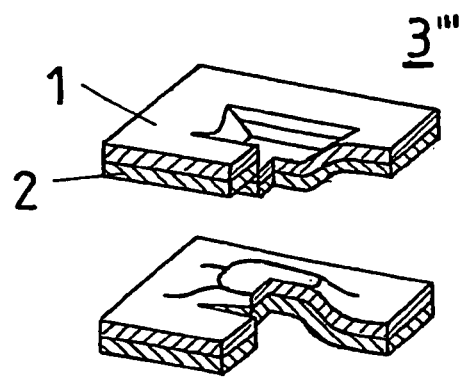
Figure 8A:
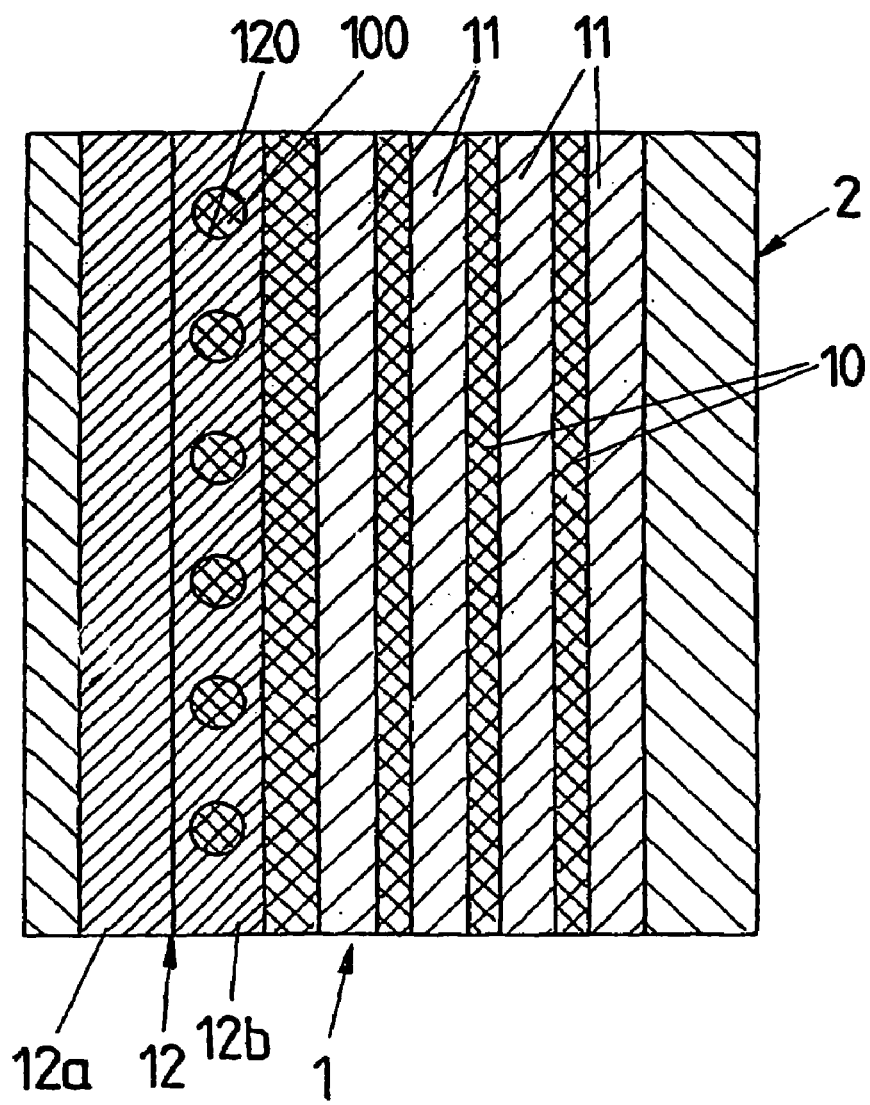
Figure 8B:
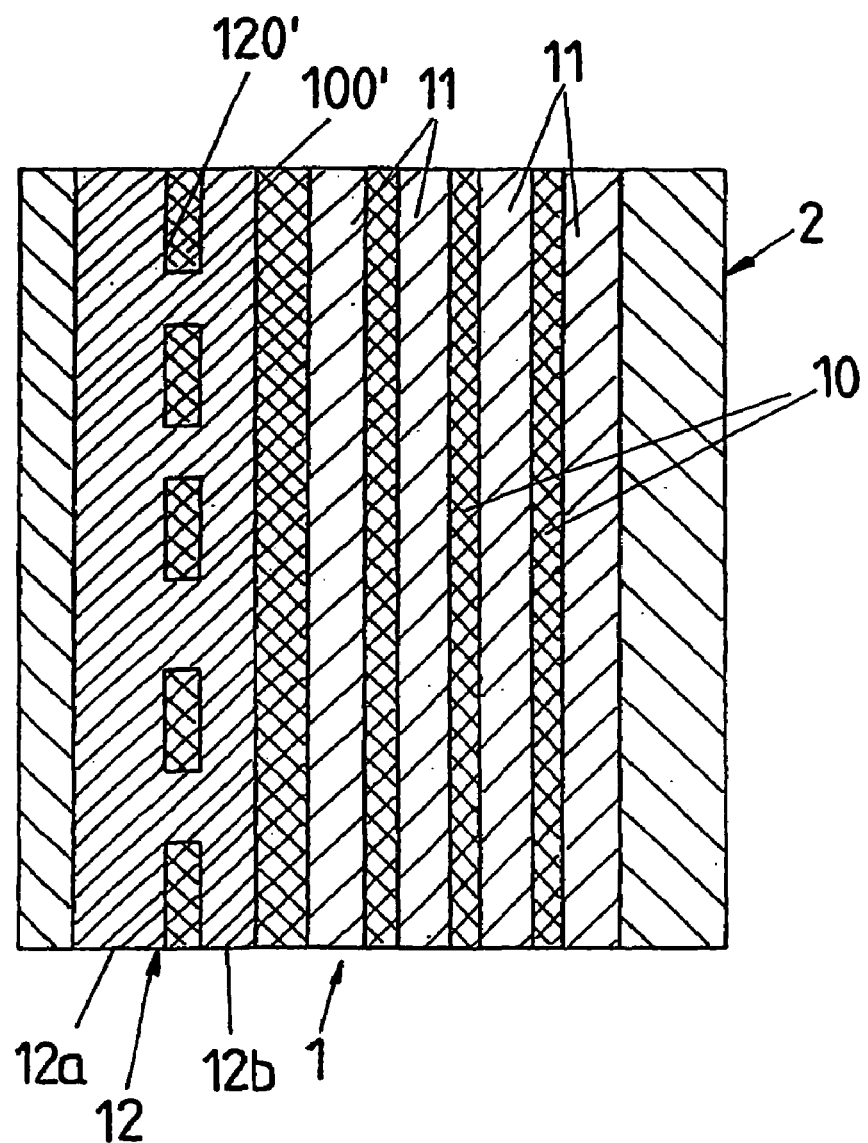
Figure 8C:
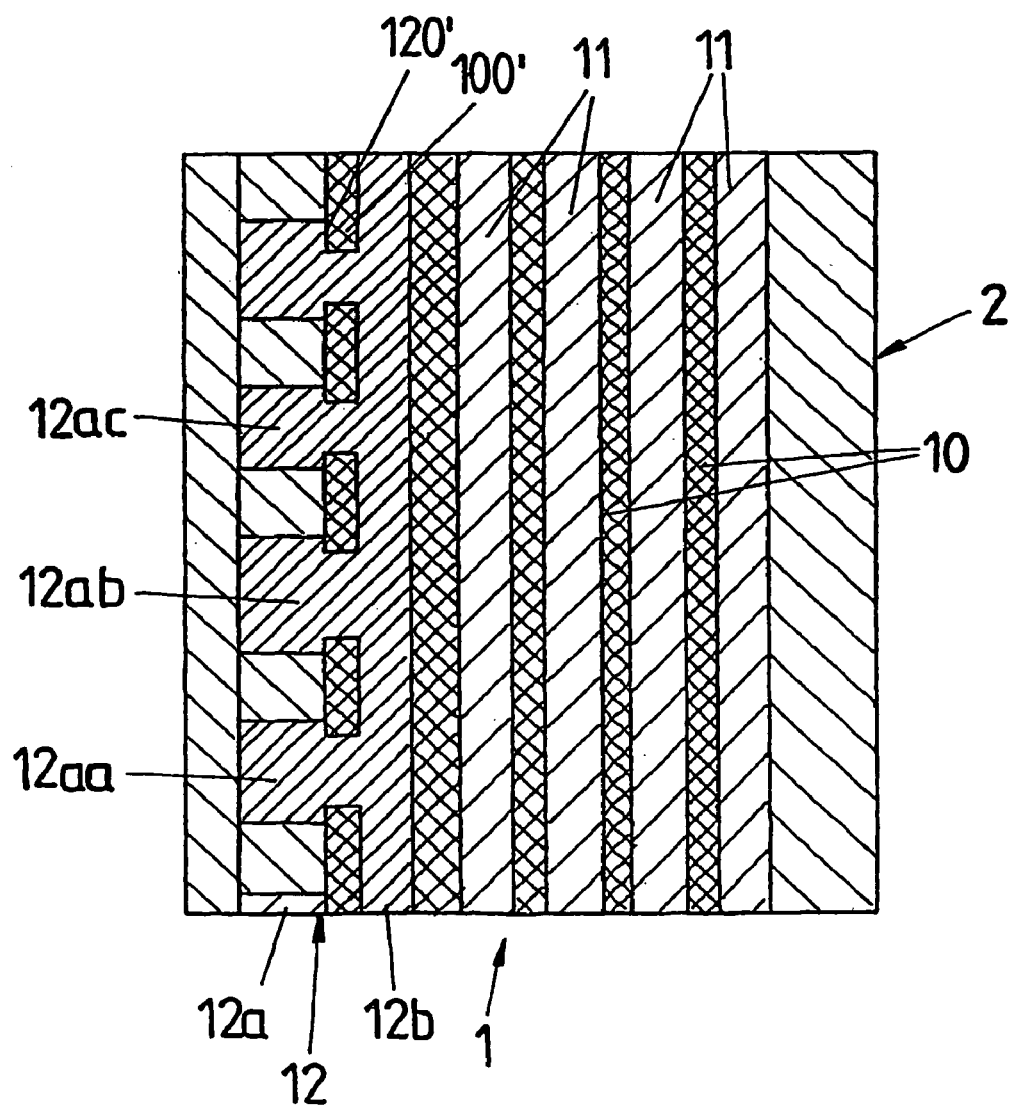
Figure 9A:
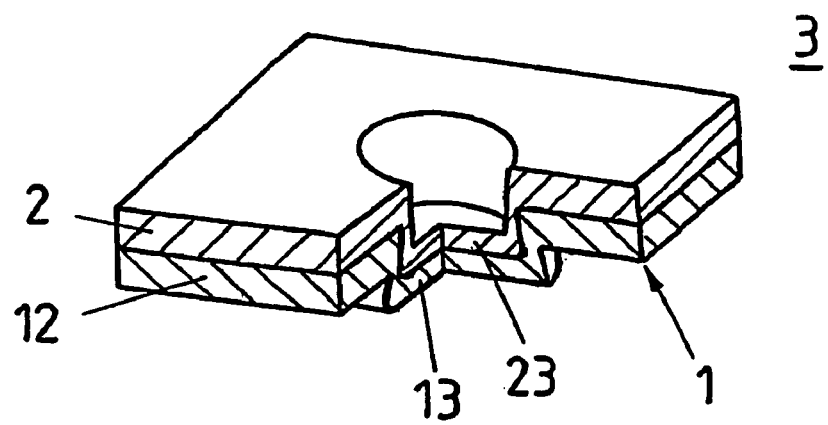
Figure 9B:
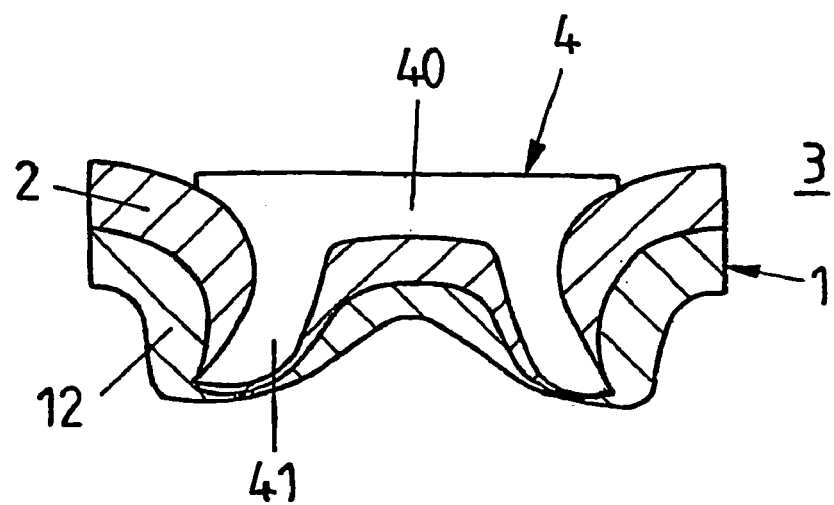
Figure 10A:
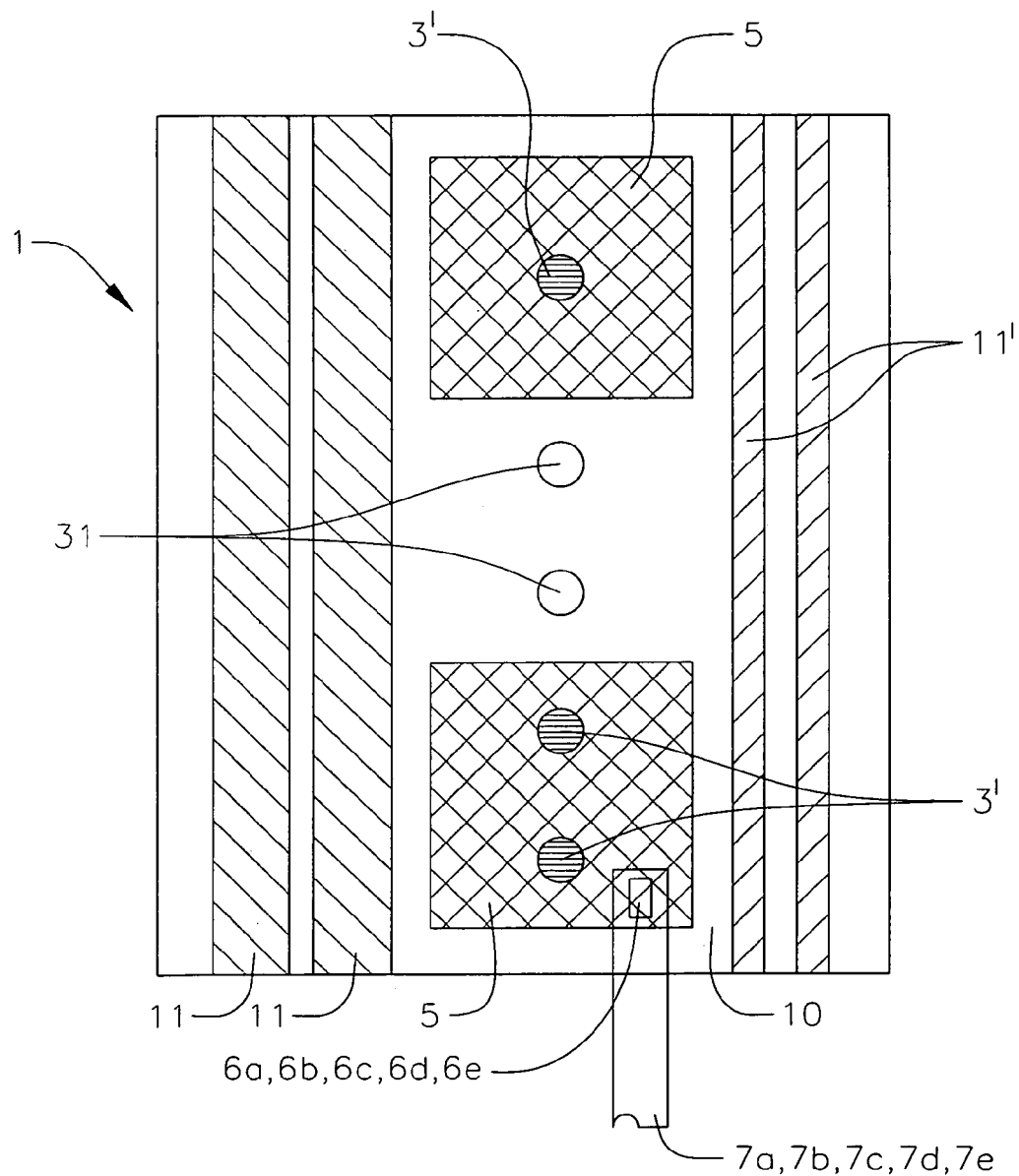
Figure 10B:
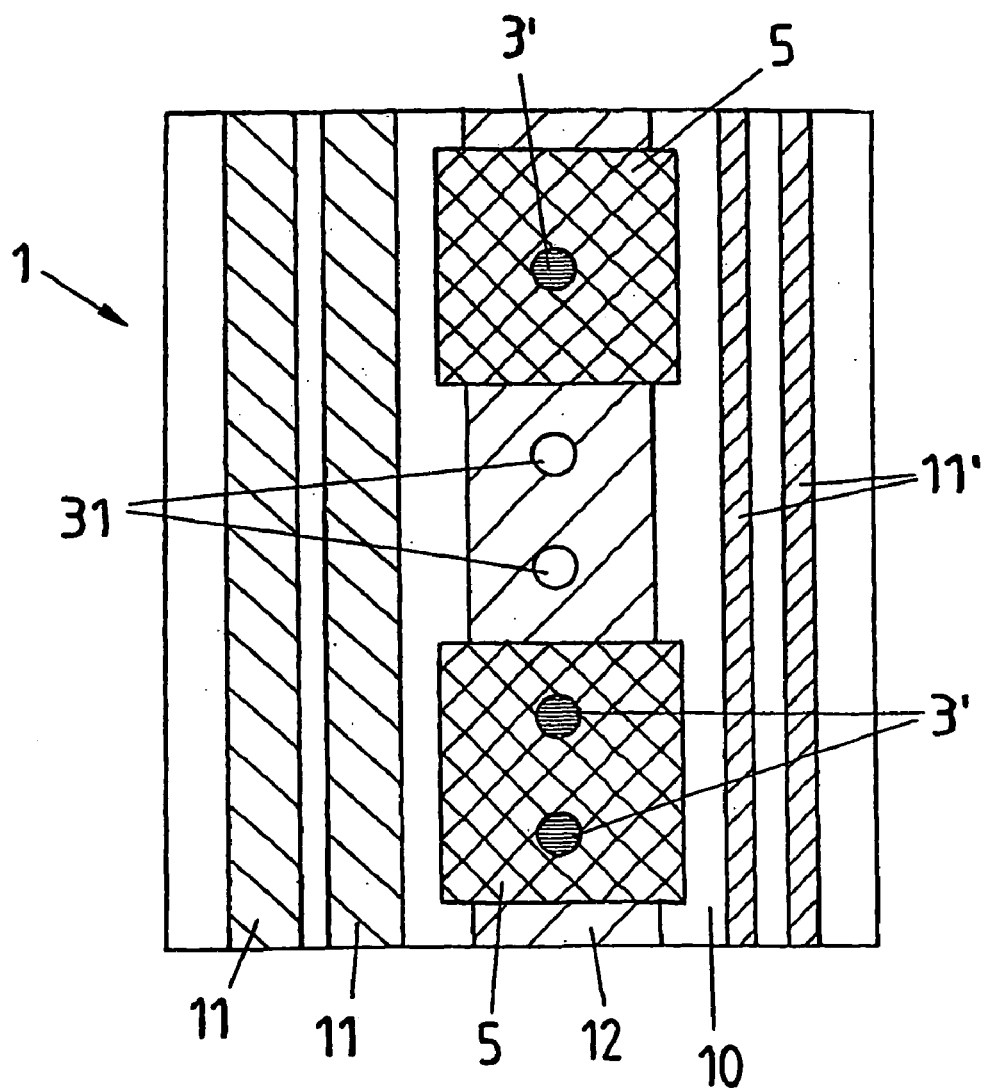
Figure 10C:
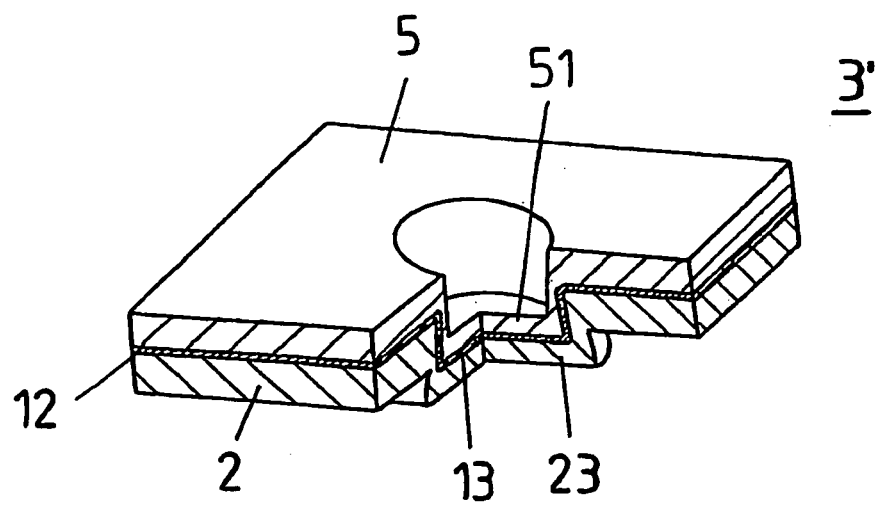
Figure 10D:
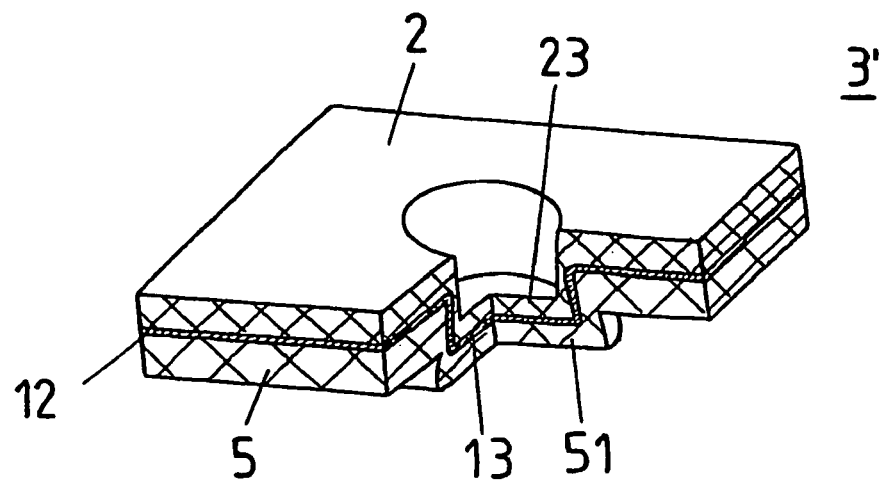
Figure 10E:
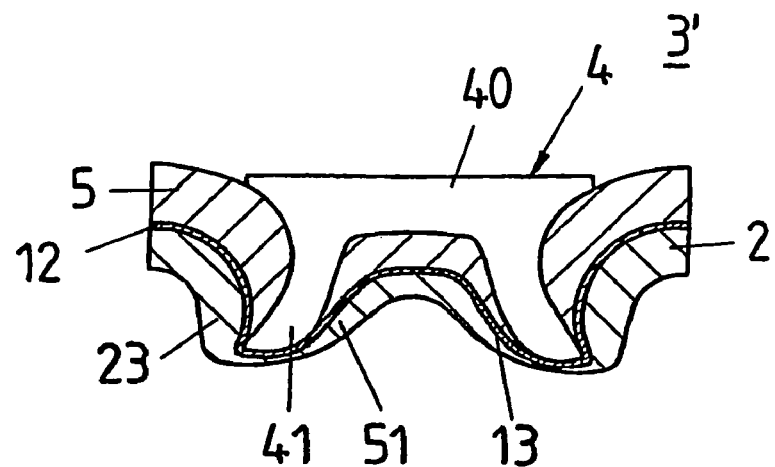
Figure 10F:
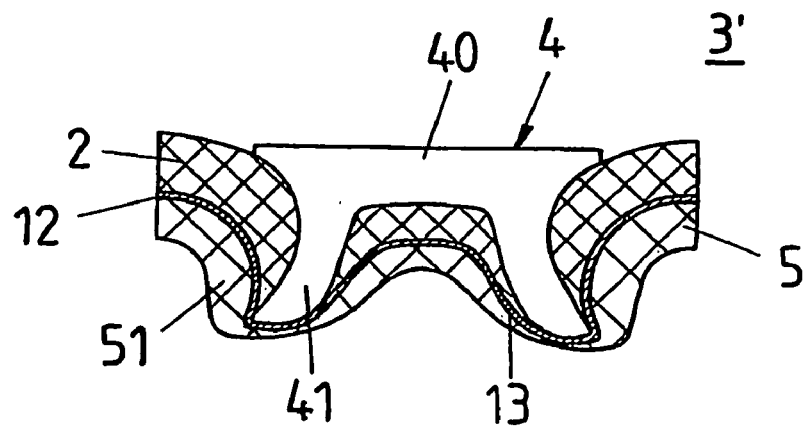
Figure 11:
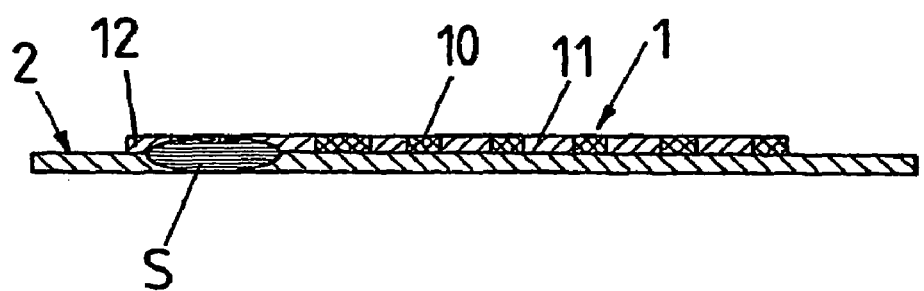

FIG. 6a a modification of the view of FIG. 5a whereby the stamped rivets engage in a plastic support of the conductor arrangement;

FIG. 6b is a section of the conductor arrangement according to FIG. 6a;

FIGS. 7a–7c are three different developments of a fixing point through which a conductor arrangement is fixed on a supporting element of a vehicle;

FIG. 8a is a plan view of a conductor arrangement to which a fixing web is linked through which the conductor arrangement can be connected to a supporting element of a vehicle;

FIG. 8b is a first modification of the embodiment according to FIG. 8a;

FIG. 8c is a second modification of the embodiment according to FIG. 8a;

FIG. 9a is a sectional view of a conductor arrangement which is fixed at a fixing point to a supporting element of a motor vehicle;

FIG. 9b is a sectional view of a conductor arrangement which is connected at a fixing point through a stamped rivet to a supporting element of a motor vehicle;

FIGS. 10a and 10b are two plan views of a conductor arrangement which is connected at several fixing points to a supporting element of a motor vehicle whereby fixing sections of additional elements are used;

FIG. 10c is a section of the embodiment of FIG. 10b in perspective view;

FIG. 10d is a modification of the embodiment of FIG. 10c whereby the fixing sections of the supporting element and the additional element are interchanged in the arrangement;

FIGS. 10e and 10f are sectional views of a conductor arrangement which has a fixing point with a stamped rivet and additional element;

FIG. 11 is a cross-sectional view through a conductor arrangement according to FIG. 1a which is connected by welding to a supporting element of a motor vehicle.

FIGS. 1a and 1b show in plan view and cross-sectional view respectively a section of a conductor arrangement 1 which is fixed on a supporting element 2, made of plastic or metal, of a motor vehicle door, e.g. a door module support or door inside panel. The conductor arrangement is a flat conductor which consists of a number of conductor paths 11 arranged parallel to each other on a flexible support body 10. The flexible support body 10 of plastic thereby completely encloses the conductor paths 11.

On the edges of the flat conductor arrangement 1, a fixing web 12 runs on either side parallel to the conductor paths 11 and like the conductor paths 11 also consists of metal. However, as opposed to the conductor paths 11, the fixing web 12 serves not for the electrical conducting of current or signals, but rather solely for fixing the flat conductor arrangement 1 on the supporting element 2 at a number of fixing points 3.

The formation of the fixing points 3 can be seen from the cross-sectional view of the conductor paths 11 and supporting element 2 in FIG. 1b as well from the partial sectional perspective view of a fixing point 3 in FIG. 1c.

According to FIGS. 1b and 1c the fixing points 3 are each formed by interlinking material sections (fixing sections 13, 23) of the fixing web 12 and the supporting element 2. The fixing sections 13, 23 are each basically pot-shaped deformations of the material of the fixing web 12 and the support element 2, respectively. The fixing section 13 of the fixing web 12 thereby engages behind an undercut section of the fixing section 23 of the supporting element 2.

The plastic deformations of the fixing sections 13, 23 illustrated in FIGS. 1b and 1c can be produced by forced joining (clinching) using a pressing ram which in the present embodiment acts on the fixing web 12 and through this on the supporting element 2. The pressing ram is associated with a matrix which is mounted underneath the supporting element and serves as an abutment for the ram, see also FIG. 4c. Through the interaction of the pressing ram with the matrix during the stamping process the fixing sections 13, 23 positively engage in each other as can be seen in FIGS. 1b and 1c. The fixing sections 13, 23 consequently form a positive locking stamped connection, produced by forced joining or clinching.

If the supporting element 2 consists of plastic then the same can be heated during the forced joining/clinching process.

It can furthermore be seen from FIGS. 1b and 1c that neither of the two fixing sections 13, 23 forms a through opening so that the relevant fixing point 3 requires no additional seal. The fixing points 3 thus in no way impair any functioning of the supporting element 2 as a wet/dry space separation in a motor vehicle door.

In order to ensure the desired stability or load bearing capacity of the connection the fixing web 12 can also be made from a different material or have a greater thickness than the conductor paths 11 of the flat conductor 1.

Figure 2:
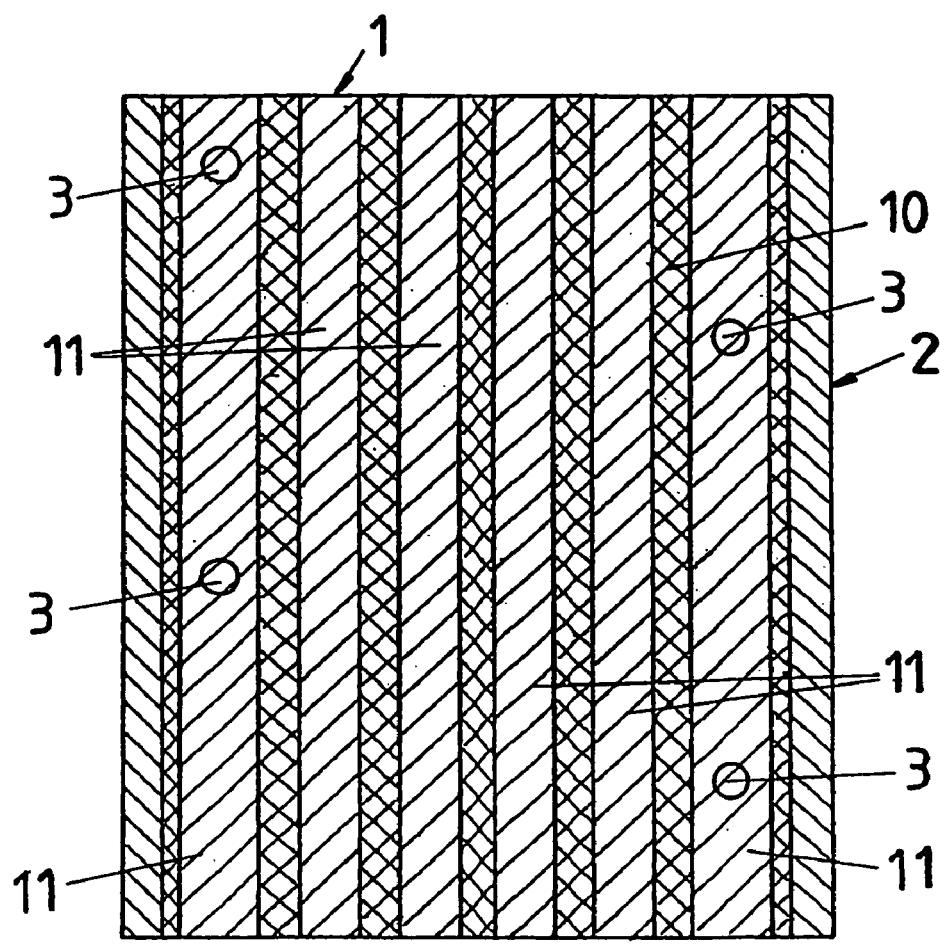
FIG. 2 is a modification of the embodiment of FIGS. 1a to 1c whereby the fixing sections of the conductor arrangement are formed directly through a conductor path.

FIG. 2 shows a modification of the embodiment of FIGS. 1a to 1c in which the difference is that the fixing points are not provided on separate fixing webs but directly on the conductor paths 11 of the flat conductor 1.

When using a supporting element 2 of metal and when creating the stamped connection at the fixing points 3 by means of forced joining/clinching, a direct contact can occur between the relevant conductor path 11 and the metal supporting element 2 in the region of the fixing sections 13, 23. This contact can be desirable in those cases where a conductor path 11 is to be grounded to earth (supporting element 2) through the fixing point 13. However, in other cases adequate insulation is also desired between the outer conductor paths 11, which serve for fixing, and the supporting element 2. In this case the relevant conductor path 11 must be insulated from the supporting element 2 so that an electrical contact is also ruled out in the region of the fixing points 3. Examples of this insulation are shown in FIGS. 3a to 3c.

According to FIG. 3a the plastic surround 10 serving as support for the flat conductor 1 is configured so that after deformation by means of forced joining/clinching it forms an insulating layer between the corresponding conductor path 11 and the supporting element 2 as it did prior to deformation. For this the plastic surround is to be made sufficiently stable; thus a sufficiently tear-resistant material is to be used and/or the plastic surround is to be made a suitable thickness.

In the embodiment illustrated in FIG. 3b a coating, for example paint, is provided on the surface of the supporting element 2 facing the conductor path 11 to produce an insulating intermediate layer between the conductor path 11 and the supporting element 2.

According to FIG. 3c a separate sealing mass 27 can also be mounted between the conductor paths 11 and the support element 2.

Figure 4A:
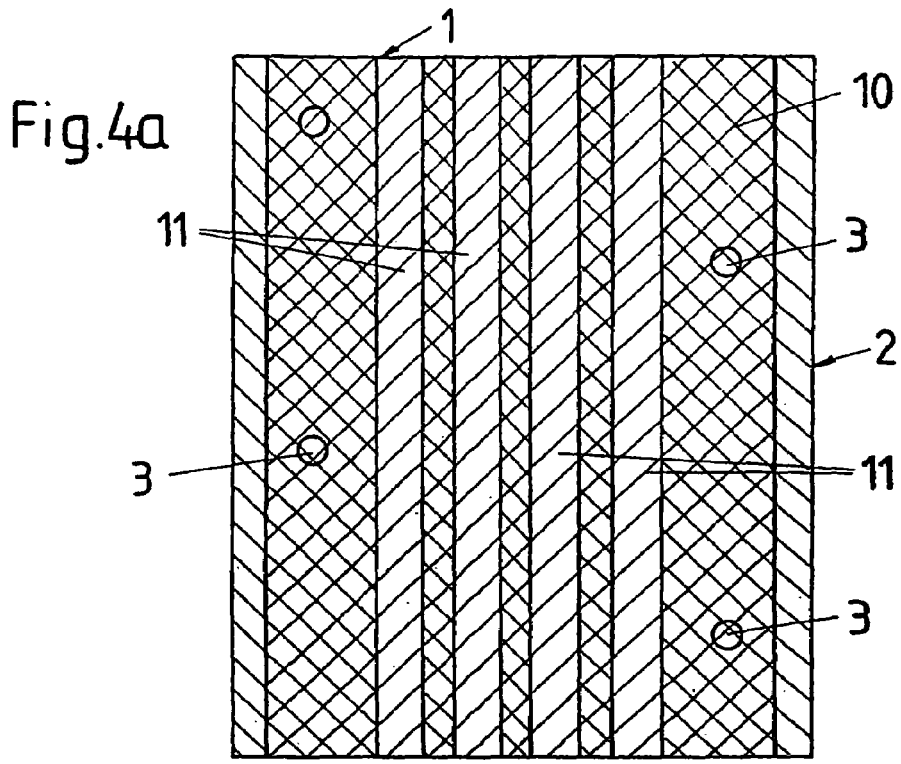
FIG. 4a is a plan view of a conductor arrangement which is connected at several fixing points to a supporting element of a vehicle whereby the fixing sections of the conductor arrangement are formed by a plastic support of the conductor arrangement.
Figure 4B:
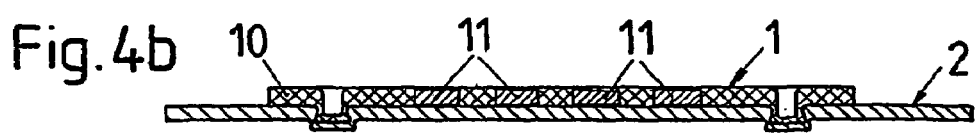

FIGS. 4a and 4b show a further modification of the embodiment of FIGS. 1a and 1b whereby, in order to form the fixing points 3 through which the flat conductor 1 is fixed on the supporting element 2, a section 14 of the support 10 of the flat conductor 1 is deformed together with an associated section 23 of the supporting element 2. Thus a fixing section 14 of the support 10 of the conductor path 11 and an associated fixing section 23 of the supporting element 1 positively engage in each other in the manner of a stamped connection.

Figure 4C:
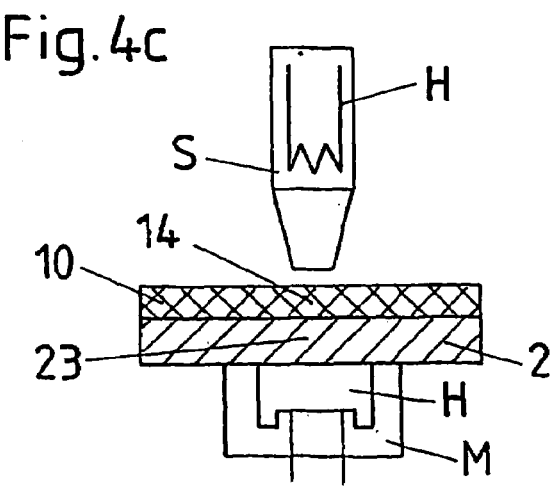
FIG. 4c is a method step when producing the connection between the conductor arrangement and the supporting element according to FIGS. 4b and 4c.

One example for making a stamped connection of this kind by means of forced joining/clinching is shown in FIG. 4c and comprises a pressing ram S with heating wire H as well as an associated matrix M with heating device H. Through the action of the pressing ram S on the fixing section 14 of the support 10 which is made of plastics and on the fixing section 23 of the supporting element 2, with the matrix M acting as an abutment, the desired plastic deformation of the fixing sections 14, 23 can be produced by producing a positive locking stamped embossed connection. The pressing ram S and the matrix M can thereby be optionally arranged so that the ram S acts either directly on the fixing section 14 of the support 10 or conversely directly on the fixing section 23 of the supporting element 2. The latter corresponds to the arrangement of the ram S and the matrix M shown in FIG. 4c rotated about 180 degrees.

The pressing ram S and/or the matrix M can be heated by means of the heating devices H before acting on the fixing sections 14, 23. This is particularly advantageous when acting on fixing sections made of plastic.

The embodiments of the invention illustrated and explained above are each characterised in that in order to fix a conductor arrangement 1 on a supporting element 2, sections of the conductor arrangement 1 on one side and of the supporting element 2 on the other are each directly plastically deformed so that they positively interlink with each other (stamped embossed connection). Additional fixing elements are not required in this case.

Figure 5B:
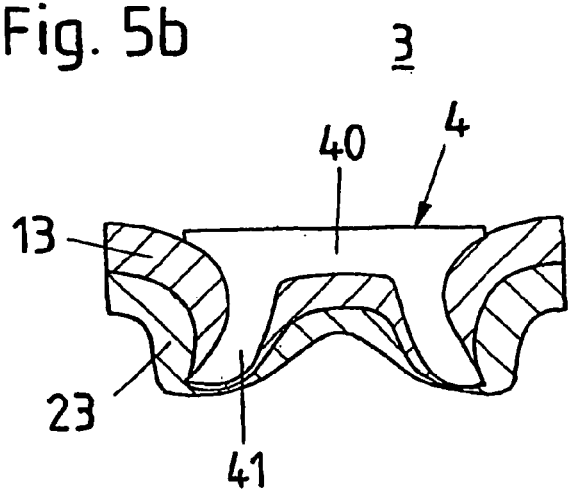
FIG. 5b is a section of the embodiment of FIG. 5a in perspective view.

In the embodiments illustrated in FIGS. 5a and 5b a stamped rivet 4 is provided as an additional fixing means at each fixing point 3. The rivet is thus inserted in each fixing section 13 of an additional fixing web 12 of the flat conductor 1, as well in an associated fixing section 23 of the supporting element 2, so that its lower section 41 (which is remote from the head 40 of the rivet 4) is spread open so that it engages positively into the fixing sections 13, 23.

Also in this embodiment there are no through openings in the region of the fixing points 3 so that this connection also causes no problems when using the supporting element 2 as a wet/dry space separation.

Alternatively one of the conductor paths 11 which initially is used to supply signals or current can also serve directly to form a fixing section 13. Corresponding measures can be taken here for insulation as explained with reference to FIGS. 3a to 3c.

The embodiment illustrated in FIGS. 6a and 6b represents a modification of the embodiment of FIGS. 5a and 5b, namely to the extent that the stamped rivets 4 at the fixing points 3 each engage in a fixing section 14 of the plastic support 10 of the flat conductor 1 and in an associated fixing section 23 of the supporting element 2.

FIGS. 7a to 7c show in perspective view three further possible developments of a fixing point 3', 3", 3'" through which a conductor arrangement 1 can be connected to a supporting element 2 in the manner described above. FIG. 7c shows the fixing point 3'" both in perspective plan view and also in a perspective lower view.

As can be seen from FIGS. 7a to 7c the pot-shaped fixing point 3 does not need to be formed circular, as is the case with the embodiments previously shown. The fixing points 3', 3", 3'" illustrated in FIGS. 7a to 7c each have a substantially rectangular base surface whereby projections or indentations can additionally be provided in the walls of the relevant fixing point. The shape of the relevant fixing point is to a considerable extent determined by the cross-sectional surface area of the pressing ram S used to produce the fixing point, see FIG. 4c. The invention can be implemented with any shaped pressing ram provided a sufficient deformation of the parts which are to be fixed against each other is achieved so that they interlink with each other.

FIG. 8a shows in plan view a conductor arrangement in the form of a flat conductor 1 which has a number of parallel conductor paths 11 mounted on a plastic support 10. Furthermore a fixing web 12 is provided which serves to fix the flat conductor 1 against a supporting element 2 of the motor vehicle. This fixing web 12 has a first web section 12a through which the fixing web 12 can be fixed against the supporting element 2 of the motor vehicle by suitable fixing points (as shown above with reference to FIGS. 1a to 7c). These fixing points are not shown in FIG. 8a, which shows the flat conductor 1 and supporting element 2 prior to their final connection through fixing points using a suitable pressing ram.

A second web section 12b of the fixing web 12 which extends next to the first web section 12a and parallel thereto serves to connect the fixing web 12 to the flat conductor 1, namely to its plastic support 10. For this the fixing web 12 has in its second web section 12b a number of circular round holes 120 which are fitted onto corresponding projections 100 of the plastic support 10. A positive locking connection is hereby produced between the fixing web 12 and the plastic support 10 of the flat conductor 1.

The plastic support 10 thereby preferably extends only behind the second web section 12b of the fixing web 12 which serves to connect the fixing web 12 to the plastic support 10. The first web section 12a of the fixing web 12 then lies directly on the supporting element 2 so that after producing the fixing points according to the invention the first web section 12a of the fixing web 12 at these points directly engages in a corresponding deformed section of the supporting element 2.

FIG. 8b shows a modification of the embodiment according to FIG. 8a in which the fixing web 12 has in its second web section 12b a number of rectangular openings 120' which are fitted onto correspondingly shaped projections 100' of the plastic support 10 so that a positive locking connection is produced.

In the embodiment according to FIG. 8c the first web section 12a of the fixing web 12 is not formed continuous in the longitudinal direction but consists of several part sections 12aa, 12ab, 12ac . . . . arranged in succession in the longitudinal direction. From FIG. 8c it can be seen particularly clearly that in the region of the first web section 12a the fixing web 12 lies directly on the supporting element 2. This occurs because the plastic support 10 extends only underneath the second web section 12b of the fixing web 12 and not underneath the first web section 12a which is placed next to the second web section 12b of the fixing web 12.

FIG. 9a shows in a sectional view a cut-out section of a conductor arrangement 1 which is fixed on a supporting element 2, made of plastic or metal, of a vehicle door, e.g. a door module support or door inside panel. The design of the fixing point 3 can be seen from the partial sectional perspective view of a fixing point 3 in FIG. 9a.

According to FIG. 9a the fixing points 3 are each formed by interengaging material sections (fixing sections 13, 23) of the fixing web 12 and the supporting element 2. The fixing sections 13, 23 are each basically pot-shaped deformations of the material of the fixing web 12 and of support element 2, respectively. The fixing section 23 of the supporting element 2 thereby engages behind an undercut section of the fixing section 13 of the fixing web 12.

The plastic deformations of the fixing sections 13, 23 illustrated in FIG. 9a can be produced by forced joining (clinching) using a pressing ram which in the present embodiment acts on the supporting element 2 and through this on the fixing web 12. The pressing ram is associated with a matrix which is mounted underneath the supporting element and serves as an abutment for the pressing ram. Through the interaction of the ram with the matrix during the pressing process the fixing sections 13, 23 positively interlink with each other. The fixing sections 13, 23 thereby form a positive locking connection, produced by forced joining or clinching. In order to improve the strength of this connection in a further processing step, the fixing sections 13, 23 can be further deformed so that the undercut section is enlarged.

In the embodiment illustrated in FIG. 9b a stamped rivet 4 is provided as additional fixing means on the fixing point 3. The rivet is thus inserted in a fixing section 23 of the supporting element 2, as well as in an associated fixing section 13 of an additional fixing web 12 of the flat conductor 1, so that its lower section 41 (which is remote from the head 40 of the stamped rivet 4) is spread out so that it engages with positive locking action in the fixing sections 13, 23.

Also in this embodiment in the region of the fixing points 3 there are no through openings so that this connection creates no problems when using the supporting element 2 as a wet/dry space separation.

The conductor arrangements 1 illustrated in FIGS. 10a and 10b are flat conductors which, for example, consist of several parallel high-current conductor paths 11 or signal conductor paths 11' arranged on a flexible support body 10. The flexible support body 10 which consists of plastic thereby completely surrounds the conductors 11, 11'. In addition to the fixing points 3' for fixing the relevant conductor arrangement 1 on the supporting element 2, openings 31 are also provided for fixing to enable in particular pre-fixing and adjustment of the conductor arrangement 1 relative to the supporting element 2.

The development of the invention illustrated in FIGS. 10a and 10b shows at the fixing points an additional fixing plate 5 which has material properties suitable for joining. In FIG. 10a the fixing point 3' is formed from the supporting element 2, the flexible support 10 of the conductor arrangement 1 and the additional plate 5. The embodiment of FIG. 10b differs in that a fixing web 12 is used in place of the flexible support for forming a fixing point. In the middle of the flat conductor 1, as can be seen in FIG. 2b, a fixing web 12 runs on either side parallel to the conductor paths 11. The fixing web 12, like the conductor paths 11, is made of metal but as opposed to the conductor paths 11 does not serve for the electrical conduction of current or signals but rather solely for fixing the flat conductor 1 on the supporting element 2 at a number of fixing points 3'.

The additional plate 5 which is made of plastic, metal or other joinable material, has in addition to the function of fixing the conductor arrangement 1 on the supporting element 2 preferably an additional element 5' serving a further function, for example as a holder for pre-fixing or positioning a function unit or as a bearing for a gearing unit.

As a result of the additional plate 5 which is used in FIG. 10a, a fixing web 12, as provided according to FIG. 10b, is not required since the necessary strength of the connection can be guaranteed as a result of pairing the additional plate 5 with the supporting element 2. The flexible support 10 is in this embodiment pressed in between the additional plate 5 and the supporting element 2.

FIGS. 10c and 10d each show a section of FIG. 10b. The fixing points 3' are each formed by interengaging material sections 13, 23, 51 of a fixing web 12, the supporting element 2, and the additional plate 5, respectively. The fixing sections 12, 23, 51 are each basically pot-shaped deformations of the material of the fixing web 12, the supporting element 2 and the additional plate 5. According to FIG. 10c the fixing section 51 of the additional plate 5 engages behind an undercut section of the fixing web 12 which in turn engages behind an undercut section of the supporting element 2.

FIGS. 10e and 10f show in an analogy with FIG. 9b the use of a stamped rivet 4 for producing the connection between the component parts. The load bearing capacity of the fixing is in turn increased by using an additional plate 5. FIGS. 10e and 10f thereby show fixing points 3' with different joining directions, namely one from the side of the additional plate 5 (FIG. 10e) mounted on the conductor arrangement (on the fixing web 12) and one from the side of the supporting element 2 (FIG. 10f).

FIG. 11 shows a cross-section through a conductor arrangement in the form of a flat conductor 1 with several conductor paths 11 and a fixing web 12 which is fixed by means of a welding point S on a supporting element 2 of a motor vehicle. The plastics support 10 of the flat conductor 1 is thereby designed so that it does not extend underneath the fixing web 12 so that the fixing web 12 can be welded directly to the supporting element 2. Various welding techniques for producing the welding point S can be considered, in particular ultra sound welding and laser beam welding.

The solution according to the invention was described above by way of example in several embodiments using a conductor arrangement 1 which is a so-called flat or foil conductor which comprises several flat conductor paths mounted on a plastic support or in a plastic casing. The solution according to the invention can however also be used on other conductor arrangements such as e.g. on flexible conductor plates which are printed with conductor paths, laminated foil conductors, or extruded flat conductors.

The arrangements described above, which describe use in motor vehicles by way of example, can also be used in the same way in any other device, e.g. in household appliances, electrical machines, tools or other apparatus. This is because the design of the connection between the component parts according to the invention is independent of the device or appliance for which the element supporting the conductor arrangement is intended.

The invention claimed is:

1. A motor vehicle sub-assembly comprising
   a supporting element,
   a flat conductor arrangement fixed on the supporting element and serving to supply current to electrical components of a vehicle or to send signals,
   wherein the flat conductor arrangement comprises a plurality of substantially parallel conductors mounted by a flexible support body that supports the conductors;
   wherein the plurality of substantially parallel conductors are insulated from each other by the flexible support body; and
   wherein at least one fixing section of the conductor arrangement and an associated fixing section of the supporting element are plastically deformed so that the one fixing section engages in an undercut section of the other fixing section, the at least one fixing section of the conductor arrangement comprising a conductor path of at least one of the conductors.

2. A motor vehicle sub-assembly according to claim 1 wherein the fixing sections engage in each other without forming a through opening.

3. A motor vehicle sub-assembly according to claim 1 or 2 wherein the at least one fixing section of the conductor arrangement and the associated fixing section of the supporting element are arranged so that the fixing section of the supporting element engages in the fixing section of the conductor arrangement so that the fixing section of the conductor arrangement engages at least in part around the fixing section of the supporting element.

4. A motor vehicle sub-assembly according to claim 1 wherein the at least one fixing section of the conductor arrangement, the associated fixing section of the supporting element and a fixing section of an additional element are arranged so that the three fixing sections engage in each other.

5. A motor vehicle sub-assembly comprising
   a supporting element and a conductor arrangement fixed on the supporting element and serving to supply current to electrical components of a vehicle or to send signals, wherein at least one fixing section of the conductor arrangement and an associated fixing section of the supporting element are plastically deformed so that the one fixing section engages in an undercut section of the other fixing section;

wherein at least one fixing section of the conductor arrangement, an associated fixing section of the supporting element and a fixing section of an additional element are arranged so that the three fixing sections engage in each other;

wherein the additional element serves a multi-function as a mechanical element of a function unit.

6. A motor vehicle sub-assembly comprising a supporting element and a conductor arrangement fixed on the supporting element and serving to supply current to electrical components of a vehicle or to send signals, wherein at least one fixing section of the conductor arrangement and an associated fixing section of the supporting element are plastically deformed so that the one fixing section engages in an undercut section of the other fixing section;

wherein at least one fixing section of the conductor arrangement, an associated fixing section of the supporting element and a fixing section of an additional element are arranged so that the three fixing sections engage in each other;

wherein the additional element serves additionally as fixing hook for a door element.

7. A motor vehicle sub-assembly comprising a supporting element and a conductor arrangement fixed on the supporting element and serving to supply current to electrical components of a vehicle or to send signals, wherein at least one fixing section of the conductor arrangement and an associated fixing section of the supporting element are plastically deformed so that the one fixing section engages in an undercut section of the other fixing section;

wherein at least one fixing section of the conductor arrangement, an associated fixing section of the supporting element and a fixing section of an additional element are arranged so that the three fixing sections engage in each other;

wherein the additional element serves additionally as a holder for fixing a cable.

8. A motor vehicle sub-assembly comprising a supporting element and a conductor arrangement fixed on the supporting element and serving to supply current to electrical components of a vehicle or to send signals, wherein at least one fixing section of the conductor arrangement and an associated fixing section of the supporting element are plastically deformed so that the one fixing section engages in an undercut section of the other fixing section;

wherein at least one fixing section of the conductor arrangement, an associated fixing section of the supporting element and a fixing section of an additional element are arranged so that the three fixing sections engage in each other wherein the additional element serves additionally as a holding or fixing element for a housing of a function unit.

9. A motor vehicle sub-assembly according to claim 1 wherein the conductor arrangement is fixed on the supporting element at a number of fixing points.

10. A motor vehicle sub-assembly according to claim 1 wherein the conductor arrangement is connected to the supporting element by at least one fixing point by means of forced joining.

11. A motor vehicle sub-assembly according to claim 1 wherein the conductor arrangement is connected to the supporting element by at least one fixing point by means of a stamped rivet.

12. A motor vehicle sub-assembly according to claim 11 wherein the stamped rivet engages at the fixing point into the two fixing sections without passing through one of the fixing sections.

13. A motor vehicle sub-assembly according to claim 11 or 12 wherein the stamped rivet is spread out so that it engages behind at least one of the fixing sections.

14. A motor vehicle sub-assembly according to claim 1 wherein the conductor arrangement has at least one fixing web which extends next to the conductor paths of the conductor arrangement and which forms at least one fixing section of the conductor arrangement.

15. A motor vehicle sub-assembly according to claim 1 wherein at least one fixing section of the conductor arrangement is formed by a conductor path of the conductor arrangement.

16. A motor vehicle sub-assembly according to claim 1 wherein at least one fixing section of the conductor arrangement is formed by the flexible support body of the conductor arrangement.

17. A motor vehicle sub-assembly according to claim 1 wherein at least one fixing section of the conductor arrangement is insulated from the supporting element.

18. A motor vehicle sub-assembly according to claim 17 wherein insulation is provided on the conductor arrangement.

19. A motor vehicle sub-assembly according to claim 17 wherein insulation is provided on the supporting element.

20. A motor vehicle sub-assembly comprising a supporting element, a conductor arrangement fixed on the supporting element and serving to supply current to electrical components of a vehicle or to send signals, and wherein the conductor arrangement comprises a plurality of conductors;

wherein a portion of at least one of the conductors of the conductor arrangement and an associated fixing section of the supporting element are plastically deformed so that the portion of the at least one of the conductors engages in an undercut section of the associated fixing section.

21. A motor vehicle sub-assembly according to claim 1 wherein the one fixing section of the conductor arrangement and the associated fixing section of the supporting element are plastically deformed away from the flexible support body.

22. A motor vehicle sub-assembly according to claim 1 wherein the one fixing section of the conductor arrangement and the associated fixing section of the supporting element are plastically deformed in a manner so that no two of the plurality of substantially parallel conductors are plastically deformed with each other.

23. A motor vehicle sub-assembly according to claim 1 wherein the supporting element is for supporting the parallel conductors in a first direction and wherein the flexible support body is for supporting the parallel conductors in a second direction perpendicular to the first direction.

24. A motor vehicle sub-assembly according to claim 10 wherein the means of forced joining includes a heating device.

25. A method for fixing a flat conduction arrangement to a supporting element of a motor vehicle sub-assembly, the method comprising:

mounting a plurality of substantially parallel conductors with a flexible support body to form a flat conductor arrangement;

placing the flat conductor arrangement on the supporting element of the motor vehicle sub-assembly to support the substantially parallel conductors in a first direction; and plastically deforming a portion of at least one of the conductors of the conductor arrangement and an associated fixing section of the supporting element to fix the portion of the at least one of the conductors to an undercut section of the associated fixing section, wherein the flexible support body further supports the substantially parallel conductors in a second direction perpendicular to the first direction, and wherein the plurality of substantially parallel conductors are insulated from each other by the flexible support body.

26. The method of claim 25 wherein, during the plastically deforming of the portion of the at least one of the conductors of the conductor arrangement and the associated fixing section of the supporting element, no two of the plurality of substantially parallel conductors are plastically deformed with each other.

* * * * *

UNITED STATES PATENT AND TRADEMARK OFFICE
CERTIFICATE OF CORRECTION

PATENT NO. : 7,152,907 B2
APPLICATION NO. : 10/487470
DATED : December 26, 2006
INVENTOR(S) : Salhoff et al.

It is certified that error appears in the above-identified patent and that said Letters Patent is hereby corrected as shown below:

On the Title Page

| | |
|---|---|
| (73) Assignee | Delete "Fahrzeugtelle", Insert --Fahrzeugteile-- |
| (57) Abstract | Replace the abstract listed with the following abstract --A sub-assembly for a motor vehicle unit, especially the door unit of a motor vehicle, includes a support element and a conductor arrangement which is fixed to the support element. At least one fixing section of the conductor arrangement and one fixing section associated with the support section are plastically deformed in such a way that they interlink with each other.-- |
| (56) References Cited OTHER PUBLICATIONS, pg. 2, col. 2 English Translation of International. . . | Delete "Nov. 11, 2003", Insert --Nov. 20, 2003-- |

In the Claims

| | |
|---|---|
| Col. 11, line 13, Claim 5 | After "other;", Insert --and-- |
| Col. 11, line 30, Claim 6 | After "other;", Insert --and-- |
| Col. 11, line 47, Claim 7 | After "other;", Insert --and-- |
| Col. 11, line 64, Claim 8 | Delete "other", Insert --other; and-- |

UNITED STATES PATENT AND TRADEMARK OFFICE
CERTIFICATE OF CORRECTION

PATENT NO.       : 7,152,907 B2
APPLICATION NO.  : 10/487470
DATED            : December 26, 2006
INVENTOR(S)      : Salhoff et al.

It is certified that error appears in the above-identified patent and that said Letters Patent is hereby corrected as shown below:

Col. 12, line 46, Claim 20    After "conductors;",
                                                            Insert --and--

Signed and Sealed this

Twenty-fifth Day of March, 2008

JON W. DUDAS
*Director of the United States Patent and Trademark Office*